United States Patent
Bouchard et al.

(10) Patent No.: US 9,991,060 B2
(45) Date of Patent: Jun. 5, 2018

(54) ENERGY STORAGE DEVICE WITH ENHANCED ENERGY DENSITY

(71) Applicant: Maxwell Technologies, Inc., San Diego, CA (US)

(72) Inventors: Jeffrey Bouchard, San Diego, CA (US); Doug Schafer, San Diego, CA (US); Priya Bendale, San Diego, CA (US); Jeffrey G. Nelson, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 515 days.

(21) Appl. No.: 14/303,511

(22) Filed: Jun. 12, 2014

(65) Prior Publication Data

US 2014/0368973 A1    Dec. 18, 2014

Related U.S. Application Data

(60) Provisional application No. 61/835,320, filed on Jun. 14, 2013.

(51) Int. Cl.

| H01G 11/54 | (2013.01) |
|---|---|
| H01G 11/62 | (2013.01) |
| H01G 11/52 | (2013.01) |
| H01G 11/58 | (2013.01) |
| H01G 11/78 | (2013.01) |
| H01G 11/82 | (2013.01) |
| H01G 9/00 | (2006.01) |
| H01G 11/60 | (2013.01) |
| H01G 11/80 | (2013.01) |

(52) U.S. Cl.
CPC ............. *H01G 11/62* (2013.01); *H01G 11/52* (2013.01); *H01G 11/58* (2013.01); *H01G 11/78* (2013.01); *H01G 11/82* (2013.01); *H01G 11/60* (2013.01); *H01G 11/80* (2013.01); *H01G 2009/0014* (2013.01); *Y02E 60/13* (2013.01); *Y10T 29/417* (2015.01)

(58) Field of Classification Search
CPC .......... H01G 9/02; H01G 9/038; H01G 9/028; H01G 11/04; H01G 11/52; H01G 11/54; H01G 11/56
USPC ................. 361/502–504, 509–512, 516–519
See application file for complete search history.

(56) References Cited

U.S. PATENT DOCUMENTS

| 6,187,061 B1 | 2/2001 | Amatucci et al. | |
| 6,466,429 B1 * | 10/2002 | Volfkovich | H01G 9/02 |
| | | | 361/502 |

(Continued)

FOREIGN PATENT DOCUMENTS

| CN | 101506920 A | 8/2009 |
|---|---|---|
| EP | 1724795 | 11/2006 |

(Continued)

*Primary Examiner* — Nguyen Ha
(74) *Attorney, Agent, or Firm* — Knobbe, Martens, Olson & Bear, LLP

(57) ABSTRACT

An energy storage device having improved energy density performance may include an electrolyte having a salt concentration of about 0.6 moles/L (M) to about 0.95M. A final energy storage device product having a total mass of electrolyte that is at least 100% of a saturation quantity of electrolyte sufficient to fully saturate one or more electrode(s) and separator(s) of the device, and below a threshold quantity above the saturation quantity.

23 Claims, 8 Drawing Sheets

(56) References Cited

U.S. PATENT DOCUMENTS

| | | |
|---|---|---|
| 6,535,373 B1 | 3/2003 | Smith et al. |
| 7,245,478 B2 | 7/2007 | Zhong et al. |
| 2003/0086238 A1 | 5/2003 | Bendale et al. |
| 2004/0076885 A1* | 4/2004 | Sato .................... H01M 10/052 |
| | | 429/303 |
| 2007/0042271 A1* | 2/2007 | Nishida ................ C07D 207/08 |
| | | 429/306 |
| 2007/0070580 A1 | 3/2007 | Yoshida |
| 2008/0137265 A1 | 6/2008 | Venkateswaran |
| 2009/0268377 A1 | 10/2009 | Choi |
| 2012/0243145 A1* | 9/2012 | Takahashi .............. H01G 9/038 |
| | | 361/502 |
| 2013/0011728 A1* | 1/2013 | Tokuda ................. H01M 4/134 |
| | | 429/200 |

FOREIGN PATENT DOCUMENTS

| | | |
|---|---|---|
| JP | 2005197087 | 7/2005 |
| JP | 2007116102 | 5/2007 |
| JP | 2012-129477 | 7/2012 |
| WO | WO 2008/026873 | 3/2008 |
| WO | WO 2008/139619 | 7/2010 |

* cited by examiner

ENERGY STORAGE DEVICE WITH ENHANCED ENERGY DENSITY

CROSS REFERENCE TO RELATED APPLICATIONS

This application claims the benefit of U.S. Provisional Application Ser. No. 61/835,320, filed Jun. 14, 2013, entitled "ENERGY STORAGE WITH ENHANCED ENERGY DENSITY," which is hereby incorporated herein by reference in its entirety.

BACKGROUND

Field

The present invention relates generally to electrical energy storage devices, and more specifically, to the design of an electrical energy storage device electrolyte and electrode.

Description of the Related Art

Energy storage devices, such as ultracapacitors, can be used to power various electronic devices. Ultracapacitors typically include a first electrode, a second electrode, and a separator impregnated with an electrolyte, the electrolyte facilitating transport of ionic species between the first electrode and the second electrode. For example, the ultracapacitor can store electrical charge in an electrical double layer formed at an interface between an electrolyte and an electrode.

A measure of performance of an energy storage device can include a measure of the ability of the energy storage device to store energy. One such measurement is the energy density of the device. The energy density of an ultracapacitor can depend on the operating voltage of the ultracapacitor, and in general an ultracapacitor with a higher energy density is desirable because it can provide more power in a smaller footprint. In addition, an ultracapacitor with higher energy density may facilitate the use of fewer ultracapacitor cells in powering electronic devices, enabling use of the ultracapacitor to power an increased number of electronic devices, including electronic devices with constrained available space.

SUMMARY

A final energy storage device product can include a container, a first electrode, a second electrode and a separator between the first electrode and the second electrode, where the first electrode, second electrode and separator are within the container. An electrolyte within the container of the final energy storage device can have a total mass of at least 100% and less than or equal to 104% of a saturation quantity of electrolyte sufficient to fully saturate the first electrode, the second electrode and the separator.

In some embodiments, the mass of the electrolyte is less than or equal to 102% of the saturation quantity of electrolyte. In some embodiments, the mass of the electrolyte is less than or equal to 101% of the saturation quantity of electrolyte.

In some embodiments, the final energy storage device is sealed. In some embodiments, the final energy storage device is configured to operate at an operating voltage of 3 Volts (V). In some embodiments, the energy storage device has a jelly-roll configuration. In some embodiments, the electrolyte includes a salt concentration of 0.75 moles/L (M) to 0.95 M.

In some embodiments, at least one of the first electrode and the second electrode includes a plurality of perforations.

A method of fabricating an energy storage device can include providing a container, inserting a first electrode and a second electrode into the container, where a separator is positioned between the first electrode and the second electrode. The method can include adding a final, total mass of electrolyte to the container, where the total mass is at least 100% and less than or equal to 104% of a saturation quantity of electrolyte.

In some embodiments, adding the total mass of the electrolyte includes adding a mass of electrolyte less than or equal to 102% of the saturation quantity of electrolyte.

In some embodiments, the method includes sealing the energy storage device.

In some embodiments, the energy storage device includes an ultracapacitor.

In some embodiments, adding the mass of the electrolyte includes adding an electrolyte having a salt concentration of 0.7 M to 0.95 M, and where the salt includes at least one of tetraethyl ammonium tetrafluoroborate and spiro-(1,1')-bipyrrolidinium tetrafluoroborate.

In some embodiments, adding the total mass of electrolyte includes adding an additional 3 grams (g) or less of electrolyte in addition to the saturation quantity of electrolyte.

A final energy storage device product can include a container, a first electrode, a second electrode, a separator between the first electrode and the second electrode, where the first electrode, second electrode and separator are within the container. The final energy storage device can include an electrolyte within the container having a salt concentration between 0.6 moles/L (M) to 0.95M.

In some embodiments, the electrolyte includes a quaternary ammonium salt. In some embodiments, the quaternary ammonium salt includes a cation selected from the group consisting of spiro-(1,1')-bipyrrolidinium, tetraethylmethyl ammonium and tetraethyl ammonium. In some embodiments, the quaternary ammonium salt includes an anion selected from the group consisting of tetrafluoroborate.

In some embodiments, the electrolyte includes acetonitrile.

In some embodiments, the electrolyte includes a salt concentration of 0.8M.

In some embodiments, the electrolyte includes a mass of electrolyte configured to be at least 100% and less than or equal to 104% of a saturation quantity of electrolyte sufficient to fully saturate the first electrode, the second electrode and the separator.

In some embodiments, the energy storage device includes an electric double layer capacitor configured to operate at an operating voltage of 3 Volts (V).

In some embodiments, the energy storage device is sealed. In some embodiments, the energy storage device has a jelly-roll configuration. In some embodiments, at least one of the first electrode and the second electrode includes a plurality of perforations.

A method of fabricating an energy storage device can include providing a container, inserting a first electrode and a second electrode into the container, where a separator is positioned between the first electrode and the second electrode. The method can include adding an electrolyte to the container, where the electrolyte can include a salt concentration between 0.6 moles/L (M) to 0.95M.

In some embodiments, adding the electrolyte includes adding an electrolyte having salt concentration of 0.7M to 0.95M. In some embodiments, adding the electrolyte includes adding an electrolyte having salt concentration of 0.8M.

In some embodiments, adding the electrolyte includes adding at least one of a spiro-(1,1')-bipyrrolidinium tetrafluoroborate, tetraethylmethyl ammonium tetrafluoroborate and tetraethyl ammonium tetrafluoroborate.

In some embodiments, adding the electrolyte includes adding a mass of electrolyte configured to be at least 100% and less than or equal to 104% of a saturation quantity of electrolyte sufficient to fully saturate the first electrode, the second electrode and the separator.

In some embodiments, the method includes sealing the energy storage device.

A method of fabricating an energy storage device can include providing a container, inserting a first electrode and a second electrode into the container, where a separator is positioned between the first electrode and the second electrode. The method can include adding a final, total mass of electrolyte to the container with an electrolyte injection tool, wherein the total mass corresponds to the saturation quantity of electrolyte combined with an additional mass of electrolyte corresponding to the manufacturing tolerance of the electrolyte injection tool.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

DETAILED DESCRIPTION

Figure 1:
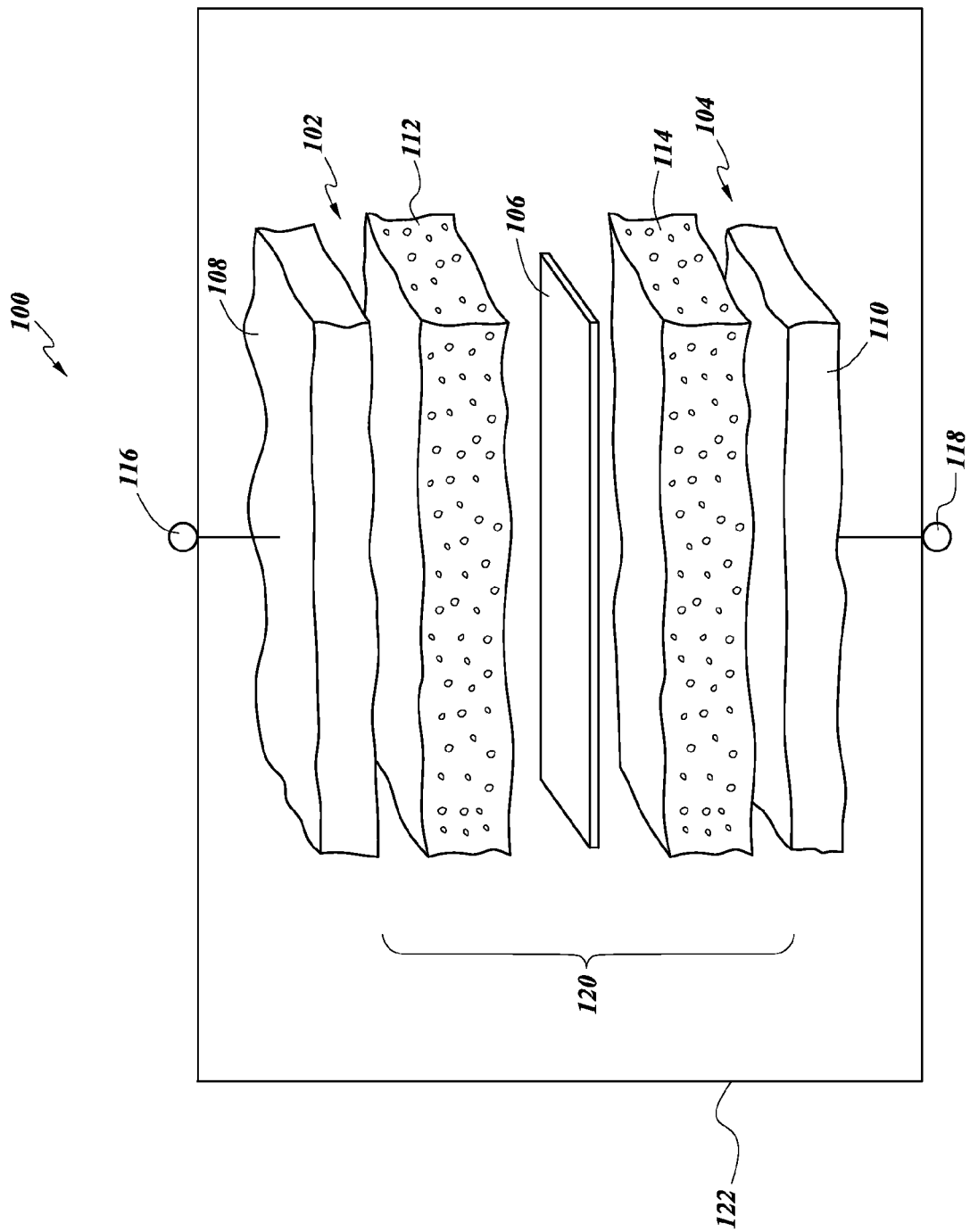
FIG. 1 shows a schematic diagram of an example of an energy storage device, according to an embodiment.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

The amount and concentration of electrolyte in an energy storage device, such as an ultracapacitor, can affect the performance of the device. For example, reduced electrolyte salt concentrations in an energy storage device can reduce ionic transport within the electrodes, and thus reduce device performance, particularly within higher power applications. An energy storage device with insufficient electrolyte, such that the electrode(s)/separator(s) within the device are not fully saturated, can also reduce device performance. Additionally, the exact quantity of electrolyte needed to fully saturate the electrode(s) and separator(s) is generally unknown for any given energy storage device. To address these difficulties, the conventional thinking was to provide energy storage devices with a high electrolyte concentration (above 1.2M) and to fill an energy storage device with an excess quantity of electrolyte under pressure, to facilitate full saturation. However, excess salt concentrations can cause precipitation of salt within the device electrodes, which can clog pores within the active material of the device electrodes, causing reduced performance. Similar precipitation of salts can occur when an energy storage device is filled with excessive electrolyte. Additionally, secondary reactions can occur within an energy storage device that has too high of a salt concentration (through overfill of electrolyte or use of a high molarity electrolyte), which in turn can release gases within the device, causing outgassing, overpressure and safety concerns. Described herein are completed energy storage device products, and related methods that use electrolytes within ranges of salt concentrations and that use electrolyte quantities that balance these competing problems.

Embodiments relate to an energy storage device having an increased energy density. Some embodiments relate to an ultracapacitor that has an increased energy density and/or lifetime performance by the use of a limited molarity electrolyte. The ranges of molarity described herein were discovered to provide improved energy density and cycle life, for example, within lower power applications, such as 3V ultracapacitors. The ranges provide such improvements while reducing local precipitation of salt, which may occur with higher molarity electrolyte concentrations.

Some embodiments relate to an ultracapacitor with increased energy density and/or lifetime performance through the use of a limited quantity of electrolyte. For example, the total mass of the electrolyte used to form the final ultracapacitor product may be at least 100% and below an upper threshold of a saturation quantity of electrolyte sufficient to fully saturate one or more electrode(s) and separator(s) of the device. The "saturation quantity" of electrolyte as used herein corresponds to the minimum amount of electrolyte in a container having electrodes that is required to fully cover the electrodes and also saturate the accessible spaces of electrodes. For example, the saturation quantity would include the amount of electrolyte that is disposed between the material particles of two electrode films, and also within pores of each electrode film and any separator film at room temperature and pressure, after reaching a steady state condition. The saturation quantity of electrolyte can depend in part on one or more energy storage device characteristics. For example, the quantity of and/or a porosity of an electrode carbon material, the quantity of and/or density of a separator material, the density of the electrolyte, perforations in the electrode(s) (if any), or other characteristics, can all affect the saturation quantity of electrolyte. The ultracapacitor can include an electric double layer capacitor (EDLC), configured to provide electrostatic storage of the electrical energy achieved by separation of charge in a Helmholtz double layer at an interface between the surface of an electrode and an electrolyte of the ultracapacitor. In some embodiments, the ultracapacitor can be configured to operate at an operating voltage of about 3 Volts (V). The limited molarity electrolyte may be an acetonitrile-based electrolyte. The electrolyte can have a molarity of less than about 1 M. The electrolyte can have a molarity between approximately 0.6 moles/L (M) to 0.95M. In some embodiments the electrolyte molarity is approximately 0.8 M. The limited quantity of electrolyte of an energy storage device was created by having a zero or substantially zero electrolyte overfill beyond a saturation quantity of electrolyte for saturating the capacitor electrode(s) and separator(s), or an overfill that is less than or equal to a threshold percentage above such a saturation electrolyte quantity. An energy storage device having the limited molarity electrolyte, and/or the limited quantity of electrolyte was found to have improved energy density performance over a lifetime of the energy storage device. In one embodiment, this combination of features was found to provide an energy storage device with a greater than about 25% improvement in energy density over the lifetime of the energy storage device in comparison to similar products that did not include these features.

In some embodiments, the energy storage device can include one or more electrodes which have one or more perforations. An electrode having perforations may be used to help the limited quantity of electrolyte, and/or the electrolyte with reduced salt concentration more easily permeate the electrode material. An energy storage device having the limited molarity electrolyte, the limited quantity of electrolyte, and the perforated electrode was found to have improved energy density performance over a lifetime of the energy storage device. For example, determining an energy density performance of an ultracapacitor over a lifetime of the ultracapacitor can include applying a voltage to the ultracapacitor for an extended period of time and periodically cycling the ultracapacitor to measure an amount of stored energy, and/or applying a constant current to the ultracapacitor and repeatedly charging and discharging the ultracapacitor. In some embodiments, an energy density performance of the ultracapacitor over the lifetime of the device, such as an electric double layer capacitor (EDLC), can be measured by a rate of capacitance fade and/or a rate of increase in equivalent series resistance (ESR) of the ultracapacitor after periodically cycling the ultracapacitor between cycling voltages and/or applying a constant current to the ultracapacitor and repeatedly charging and discharging the ultracapacitor.

FIG. 1 shows a schematic diagram of an example of an energy storage device 100, according to an embodiment. In some embodiments, the energy storage device 100 can be an ultracapacitor, such as an EDLC configured to operate at an operating voltage of about 3V, having an improved energy density performance and/or lifetime performance. The device 100 can include a limited quantity of electrolyte. Energy storage device 100 can include a container 122 in which is provided one or more electrodes. For example, device 100 can include a first electrode 102, a second electrode 104, a separator 106 between the first electrode 102 and the second electrode 104, and a quantity of electrolyte 120 sufficient to at least fully saturate the first electrode 102, the second electrode 104, and the separator 106, while not providing a significant reservoir of the electrolyte 120 in excess of the quantity sufficient to fully saturate the first electrode 102, the second electrode 104, and the separator 106, or a zero or near zero over-saturated electrolyte fill level.

The electrolyte 120 may include any number of electrolytic solutions containing ions and suitable for use in the energy storage device 100. For example, the electrolyte 120 can include a solvent and a salt, the salt providing mobile ionic species, such as an anion and a cation. The electrolyte 120 can enable transport of ionic species within and/or between the first electrode 102 and the second electrode 104 to facilitate desired electrical and/or lifetime performances. In some embodiments, the electrolyte 120 may exhibit chemical and/or electrochemical stability under the operating conditions of the energy storage device 100 and may be able to withstand repeated charge discharge cycles of the energy storage device 100. For example, the energy storage device 100 can include a quantity of the electrolyte 120 that is incorporated into the first electrode 102, the second electrode 104, and the separator 106, such that an adequate quantity of electrolyte 120 is provided to facilitate desired ionic transport within and between the first electrode 102 and the second electrode 104, while not including a significant quantity of excess electrolyte 120.

The first electrode 102 can include a first electrode film 112 adjacent a first electrode current collector 108, and the second electrode 104 can include a second electrode film 114 adjacent a second electrode current collector 110. The first electrode current collector 108 and the second electrode current collector 110 can be configured to facilitate an electrical coupling between the respective electrodes and an external circuit, for example, through terminals 116 and 118 of device 100. In some embodiments, an additional electrode film can be positioned on the side of each of current collectors 108, 110 opposed to films 112, 114, to form a double-sided double electrode. A current collector can be made of a conductive material, including for example a metallic material. In some embodiments, one or both of the current collectors 108, 110 can be made of aluminum, such as an aluminum foil. In some embodiments, one or both of the current collectors 108, 110 can be made of silver, copper, gold, platinum, palladium, and/or alloys of the metals. Other suitable conductive materials may also be possible. A current collector may have any suitable shape and/or dimension, such as a width, a length, and/or a thickness. For example, one or both of the current collectors 108, 110 may have a rectangular or substantially rectangular shape, such as a rectangular aluminum foil. The electrode films and separators can be similarly configured. In some embodiments, the current collectors 108, 110 can have a portion which extends beyond a portion of the respective electrode films to facilitate coupling of the respective electrode with an external circuit. In some embodiments, a current collector can have a thickness of about 10 microns to about 100 microns, including about 15 microns to about 30 microns, and including for example about 20 microns.

In some embodiments, the separator 106 can be configured to prevent the first electrode 102 from directly contacting the second electrode 104. For example, the separator 106 can permit transport of ionic species between the first electrode 102 and the second electrode 104, while preventing an electrical short between the first electrode 102 and the second electrode 104. The separator 106 can be made of a porous and/or perforated electrically insulating material, such as an electrically insulating polymeric material. Suitable materials for the separator 106 can include polypropylene, polyethylene, parylene, polytetrafluoroethylene (PTFE), paper, a ceramic material, mineral fibers, glass fibers, combinations thereof, and/or the like.

The first electrode film 112 and/or the second electrode film 114 can include an active material component, a binder component and/or an additive component. The first electrode film 112 and/or the second electrode film 114 can include active material and a single binder, such as PTFE, without additional binders or additives. The first electrode film 112 and/or the second electrode film 114 may include other additional components, as known by one skilled in the art. The first electrode 102 and/or the second electrode 104 may include an intermediate adhesive layer adjacent the first current collector 108 or the second current collector 110. The intermediate adhesive layer can provide added adhesion of the respective electrode film to the first current collector 108 or the second current collector 110. For example, an intermediate adhesive layer may be adjacent a first surface of a current collector, providing additional adhesion between the current collector and a corresponding electrode film. In some embodiments, an electrode does not include an intermediate adhesive layer, such that an electrode film can be directly adjacent a surface of the current collector.

The first electrode film 112 and/or the second electrode film 114 can be made of a porous material. In some embodiments, the active material component of an electrode comprises a porous material. For example, the porous active material may provide a high surface area for the electrode, facilitating increased surface area for contact between the electrolyte 120 and electrode film material to provide increased storage capacity for the energy storage device 100. In some embodiments, the porous active material may comprise a porous carbon material, such as particles of activated carbon. The porous active material may include activated carbon having a degree and/or distribution of porosity, such as a distribution of micropores, mesopores, and/or macropores configured to facilitate desired energy storage device performance, such as desired energy density performance.

In some embodiments, the electrode film can comprise at least one of a conductive additive component. The conductive additive component may improve an electrical conductivity of the electrode film. For example, the conductive additive component may comprise conductive carbon particles, including but not limited to carbon black, graphite and/or graphene.

In some embodiments, the binder component of an electrode film may provide structural support for one or more other components of the electrode film, including for example the active electrode material and/or conductive additive component. The binder component may comprise one or more polymers, the polymers providing a polymeric matrix support structure for the electrode film active material component and/or conductive additive component. In some embodiments, the binder component can comprise a fluoropolymer (e.g., polytetrafluoroethylene, PTFE), a polypropylene, a polyethylene, co-polymers thereof, and/or polymer blends thereof. Other active material components, binder components, and/or additive components may also be suitable.

Composition of an electrode film may be optimized to enable a desired energy storage performance. For example, the composition of an electrode film in an ultracapacitor may be configured to provide a desired device capacitance and/or resistance performance, for example providing a desired device energy density and/or power density performance. In some embodiments, an electrode film can comprise from about 50% to about 99% by weight of an active material component, such as activated carbon, including from about 60% to about 90% by weight. In some embodiments, an electrode film can comprise from about 1% to about 50% by weight of a binder component. In some embodiments, an electrode film can comprise up to about 30% by weight of an additive component, including for example a conductive additive component for promoting electrical conductivity of the electrode.

Continuing to refer to FIG. 1, in some embodiments, the energy storage device 100 can include a quantity of electrolyte 120 sufficient to fully saturate the first electrode film 112, the second electrode film 114 and the separator 106, without or substantially without a significant quantity of the electrolyte 120 in excess of that quantity. For example, the energy storage device 100 can include a "saturation quantity" of electrolyte as described above.

In some embodiments, the mass of electrolyte added to an energy storage device can include the saturation quantity, and an additional quantity, to compensate for errors present in manufacturing processes and/or tools. For example, the manufacturing tools that are used to inject a selected mass of electrolyte into the container generally have a tolerance of error associated with the electrolyte output from the tools. Thus, a mass of electrolyte added to the energy storage device from such tools can be selected to include an additional mass above the saturation quantity, to compensate for these errors and ensure that the electrodes and separators of the device are fully saturated. By compensating for these errors, the final mass of electrolyte used in the final energy storage device is ensured to be above the saturation quantity, while still being kept below an upper threshold, thus balancing the negative performance effects of an unsaturated electrode/separator, and preventing the negative side effects of salt precipitation and overpressure that occurs with excess electrolyte. Thus, a mass of electrolyte added to the energy storage device can be configured to ensure that the one or more electrodes and separators are at least fully saturated without providing a significant electrolyte reservoir beyond the quantity of electrolyte sufficient to fully saturate the electrodes and separators of the energy storage device.

The quantity of electrolyte sufficient to fully saturate the electrode(s) and separator(s) of an energy storage device can be determined empirically. For example, first, the mass of the energy storage device can be measured prior to impregnation of the energy storage device with electrolyte. For example, the mass of the energy storage device container and the one or more electrodes and separators of the energy storage device provided within the container can be measured prior to adding any electrolyte to the energy storage device. Subsequently, electrolyte can be added to the energy storage device. For example, the energy storage device, including its container, electrode(s), and separator(s), can be immersed in the electrolyte, such as in an electrolyte bath, for a duration of time at room temperature. Such immersion facilitates absorption of the electrolyte into the one or more electrodes and separators of the energy storage device. In one embodiment, the energy storage device can be immersed in an electrolyte bath for about 10 minutes (min) to about 20 min, such as about 15 min, at room temperature (e.g., at a temperature of about 25° C.) and under atmospheric pressure (e.g., 1 atmosphere (atm)). Electrolyte which has not been absorbed by the one or more electrodes and separators of the energy storage device can be removed from the energy storage device container. For example, the energy storage device can be shaken such that unabsorbed electrolyte can be drained from the energy storage device container. After removal of the excess electrolyte, the energy storage device container can be sealed.

Next, the sealed energy storage device can be placed in a temperature controlled environment. The sealed energy storage device can then undergo a temperature cycle from about room temperature to an elevated temperature, followed by cooling the energy storage device to a lowered temperature and then back to about room temperature. Such a temperature cycle can be repeated, for example to facilitate absorption of the electrolyte by the one or more energy storage device electrode(s) and separator(s). To start the temperature cycle, first, the temperature of the energy storage device can be increased in increments from room temperature (e.g., a temperature of about 25° C.) to the elevated temperature, such as to a temperature of about 80° C. to about 90° C., including about 85° C. For example, the temperature of the energy storage device can be increased at a rate of about 3° C. per minute from about room temperature to about 85° C. The energy storage device can be maintained at the upper temperature for a length of time. For example, the energy storage device can be maintained at 85° C. for a duration of about 1.5 hours to 3 hours, or in some examples, for about 2 hours. Subsequently, the temperature of the energy storage device can be decreased in increments over a period of time to a cooled temperature, such as to a temperature of about −30° C. to about −50° C., such as about −40° C. For example, the temperature of the energy storage device can be decreased at a rate of about 3° C. per minute to −40° C. The energy storage device can be maintained at the lower temperature for length of time. For example, the energy storage device can be maintained at about −40 C for a period of 1.5 hours to about 3 hours, or in some examples, about 2 hours. The energy storage device can then be heated to increase the temperature of the energy storage device from the lower temperature to about room temperature. For example, the temperature of the energy storage device can be increased at about 3° C. per minute until the temperature of the energy storage device reaches about room temperature. This temperature cycle can be performed once, or can be repeated one or more times.

Subsequent to the temperature cycling, the energy storage device can be immersed a second time in electrolyte, such as an electrolyte bath, for a duration of time, such as about 15 minutes. Electrolyte not absorbed by the one or more electrodes and separators of the energy storage device can be removed, for example draining excess electrolyte from the energy storage device container, leaving within the energy storage device container the one or more energy storage device electrodes and separators fully saturated by the electrolyte. The mass of energy storage device including the electrolyte saturated electrodes and separators can be measured after removal of the excess electrolyte. A difference between the mass of the energy storage device prior to the electrolyte saturation process and the mass of the energy storage device including the one or more electrodes and separators saturated by the electrolyte can be used to empirically determine the quantity of electrolyte used to fully saturate the electrodes and separators of the energy storage device.

The additional mass of electrolyte that is added above the saturation quantity can be expressed in terms of a percentage of the saturation quantity. For example, in some embodiments, a process for manufacturing an energy storage device includes adding a total mass of electrolyte to the energy storage device that is between 100% and about 104% of the saturation quantity of electrolyte. For example, a mass of electrolyte that is 100% of the saturation quantity can be added and an additional mass of electrolyte can be added, in a separate or concurrent step, up to about 4% of the saturation quantity. The resulting final energy storage device product can include an electrolyte having a mass of at least 100% and less than or equal to 104% of a mass of electrolyte sufficient to fully saturate the first electrode, the second electrode and the separator. A final energy storage device product with other ranges are anticipated, as described below with reference to FIG. 4

The additional mass of electrolyte that is added above the saturation quantity can be expressed in terms of an actual mass, based upon different sizes of energy storage devices. For example, if a manufacturing process and/or tool for addition of electrolyte into the energy storage device can include an error of about 3 grams (g), such that a tolerance of the process and/or tool is about ±3 g, an extra 3 g of electrolyte can be included in the quantity of electrolyte set to be injected into the energy storage device by the tool in the electrolyte addition process. This extra quantity of electrolyte (e.g., 3 g) is provided in addition to the quantity determined to be sufficient to saturate the one or more electrodes and separators of the device (e.g., according to one or more processes described herein), during the manufacturing process of the device. Of course, providing an additional mass above the saturation quantity that corresponds to other manufacturing process error values is also possible, such as 1 g, 2 g, 4 g, and even 5 g.

It will be understood that the embodiments described herein with respect to FIG. 1, or other figures, can be applied to various types of energy storage devices, such as capacitors, batteries, fuel cells, and hybrid devices, such as combined battery/capacitors, and/or other energy storage devices. Additionally, the embodiments described herein can be applied to different types of electrodes within said energy storage devices, such as flat or stacked electrodes, rolled electrodes, single layer, double layer, double-layer, double electrodes, and/or other types of electrodes.

Figure 2:
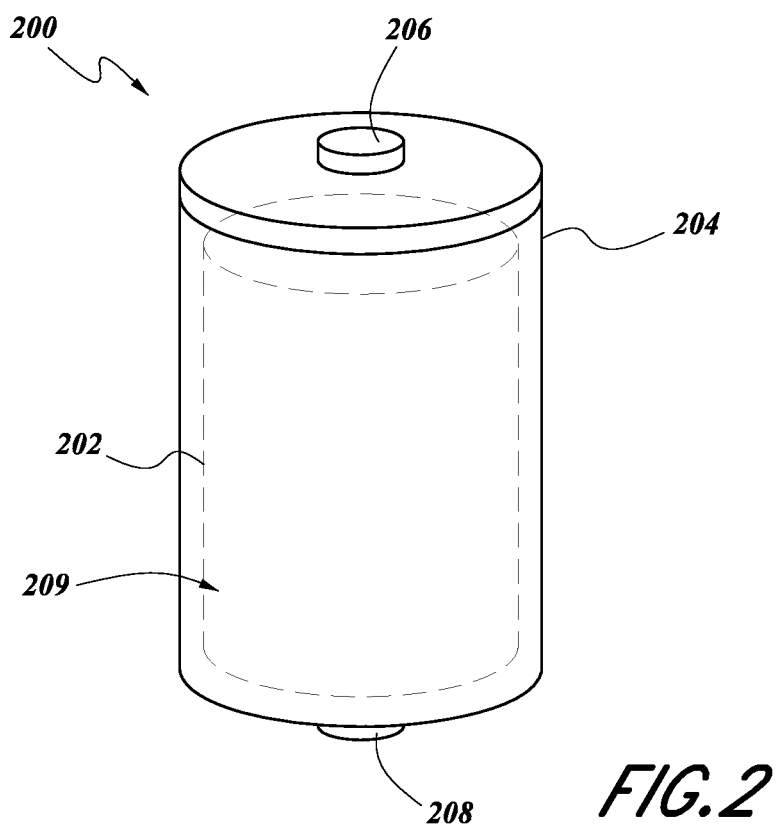
FIG. 2 shows an example of an energy storage device having a jelly-roll configuration.

FIG. 2 shows an example of an energy storage device 200 having a jelly-roll configuration. The energy storage device 200 can be similar to device 100 shown in FIG. 1. Device 200 can include a container 204, in which one or more electrodes and separators of the energy storage device 200 are provided in a rolled configuration, to form a jelly roll 202, which is immersed in electrolyte 209. The container 204 of the energy storage device 200 can have a cylindrical shape and can include a first terminal 206 and a second terminal 208 configured to facilitate electrical coupling between the energy storage device 200 and an external electrical circuit. For example, the first terminal 206 may be positioned at a first end and may comprise a positively charged terminal and the second terminal 208 may be positioned at a second opposite end and may comprise a negatively charged terminal.

Figure 3:
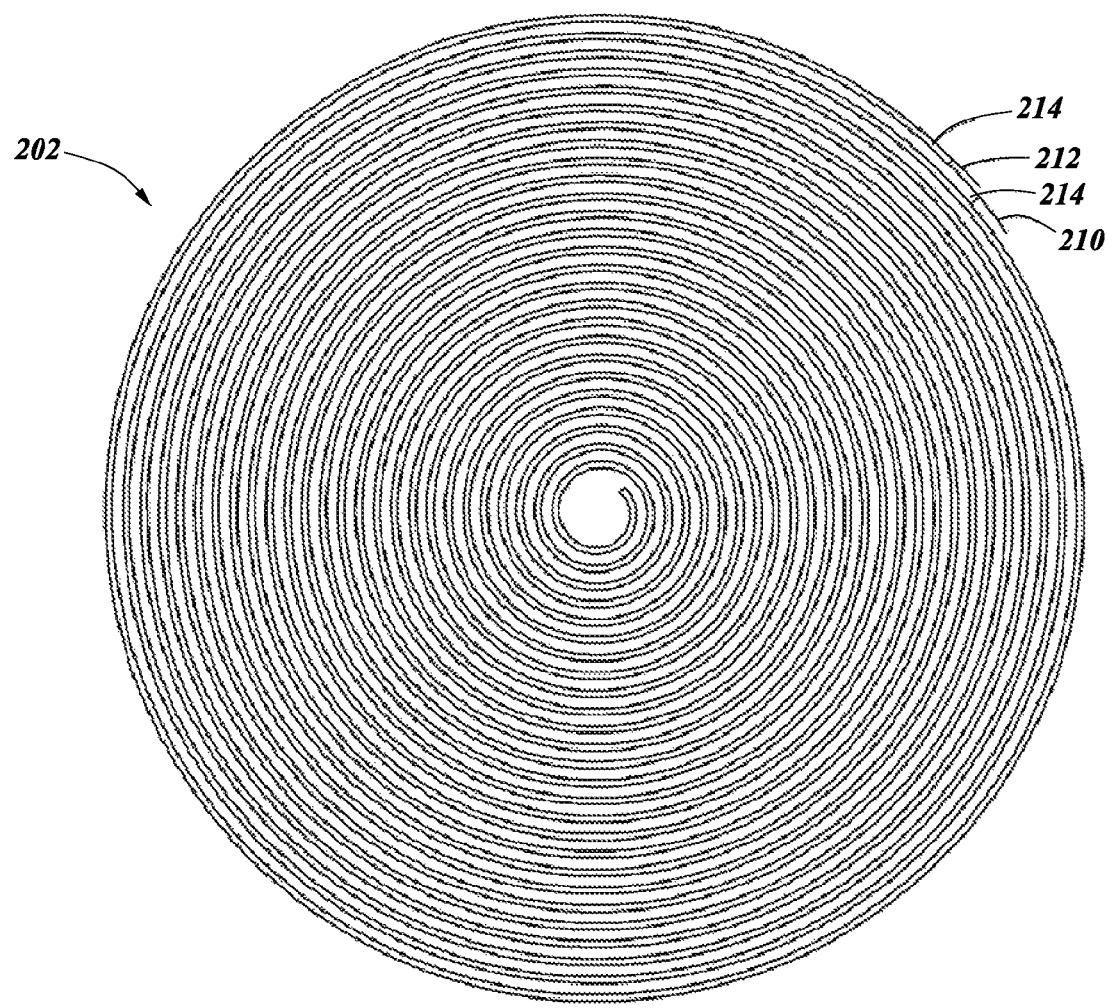
FIG. 3 shows a top-down view of the jelly-roll of FIG. 2.

FIG. 3 shows a top-down view of the jelly roll 202 of FIG. 2. The jelly roll 202 can include one or more electrodes and separators in a rolled configuration. For example, jelly roll 202 can include a first electrode 210 and a second electrode 212, and a separator 214 between the first electrode 210 and the second electrode 212. In some embodiments, the jelly roll 202 can include an additional separator 214 adjacent the first electrode 210 or the second electrode 212. In some embodiments, placement of the additional separator 214 can depend on a direction in which the electrodes and separators are rolled. An energy storage device having a jelly-roll configuration may facilitate a decreased energy storage device volume and/or a decreased energy storage weight, as compared to an energy storage device having an unrolled configuration. An energy storage device having a jelly-roll configuration, such as that shown in FIGS. 2 and 3, can include a limited quantity of electrolyte, or a quantity of electrolyte sufficient to provide desired saturation of the one or more separators and electrodes of the energy storage device without an additional significant electrolyte reservoir, or can have electrolyte of a desired molarity, as described elsewhere herein. For example, the energy storage device 200 may include a limited quantity of electrolyte 209 relative to the saturation of separator(s) and electrode(s) of jelly roll 202, similar to the amount of electrolyte described herein with respect to energy storage device 100 in FIG. 1.

Figure 4:
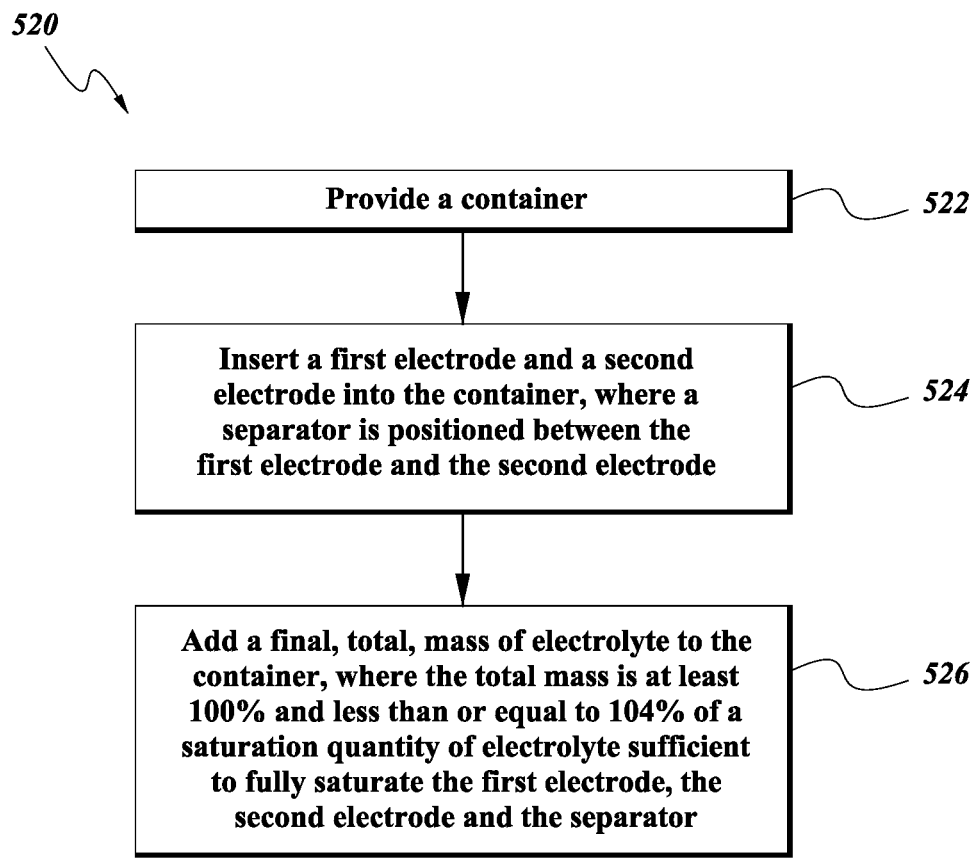
FIG. 4 shows an example of a process for fabricating a final energy storage device product having a limited quantity of electrolyte.

FIG. 4 shows an example of a process 520 for fabricating an energy storage device having a limited quantity of electrolyte. In block 522, a container can be provided. In block 524, a first electrode and a second electrode can be inserted into the container, where a separator can be positioned between the first electrode and the second electrode. As described herein, an electrode can include one or more electrode films and/or current collectors. In block 526, a final, total mass of electrolyte can be added to the container, where the mass is at least 100% and less than or equal to 104% of a mass of electrolyte sufficient to fully saturate the first electrode, the second electrode and the separator. In some embodiments, a mass of the electrolyte added can be between about 100% and 103% that of the saturation quantity. In some embodiments, a mass of the electrolyte added can be between about 100% and 102% that of the saturation quantity. In some embodiments, the mass of the electrolyte can be between about 100% and 101%, including between about 100% and 100.75% of the saturation quantity. In some embodiments, the mass of the electrolyte can be between about 100% and 100.5%, including between about 100% and 100.4%, between about 100% and 100.3%, between about 100% and 100.2%, or even as low as between about 100% and 100.1% of the saturation quantity.

In some embodiments, the energy storage devices herein can have an improved energy density performance and/or lifetime performance by providing them with electrolyte that has a salt concentration lower than a concentration typically used. For example, referring again to FIG. 1, the electrolyte 120 with which the first electrode 102, the second electrode 104 and the separator 106 of the energy storage device 100 are impregnated can have a limited molarity. For example, the electrolyte 120 can have a reduced salt concentration while providing a sufficient quantity of mobile ionic species to facilitate desired energy storage device performance. The electrolyte 120 may comprise a salt having desired solubility in the electrolyte solvent, for example desired solubility in a solvent comprising acetonitrile, such that the electrolyte 120 may have a reduced concentration while maintaining or substantially maintaining a desired ionic conductivity between the first electrode 102 and the second electrode 104 of the energy storage device 100. The salt concentration of electrolyte 209 in energy storage device 200 of FIG. 2 can be similarly limited.

In some embodiments, an energy storage device having enhanced energy density performance may include an electrolyte where the solvent comprises acetonitrile. In some embodiments, an energy storage device having enhanced energy density performance may include an electrolyte where the salt comprises a quaternary ammonium salt having desired solubility in an acetonitrile solvent. In some embodiments, a cation of the electrolytic salt comprises spiro-(1,1')-bipyrrolidinium, tetraethylmethyl ammonium, and/or tetraethyl ammonium. In some embodiments, an anion of the electrolytic salt comprises tetrafluoroborate. For example, the electrolyte may include a salt comprising spiro-(1,1')-bipyrrolidinium tetrafluoroborate (SBPTFB), tetraethylmethyl ammonium tetrafluoroborate (TEAMTFB), and/or tetraethyl ammonium tetrafluoroborate (TEATFB). For example, an electrolyte having a solvent comprising acetonitrile and a salt comprising spiro-(1,1')-bipyrrolidinium tetrafluoroborate, tetraethylmethyl ammonium tetrafluoroborate, and/or tetraethyl ammonium tetrafluoroborate can provide an electrolyte having reduced salt concentration while providing desired electrolyte stability, chemically and/or electrochemically.

In some embodiments, the electrolyte can have a salt concentration of less than 1.0 moles/L (M). For example, the electrolyte may have a concentration of about 0.95 M. For example, the electrolyte may have a concentration of about 0.75M. In some embodiments, the electrolyte can have a salt concentration of about 0.50 moles/L (M) to about 0.95M, including from about 0.60 moles/L (M) to about 0.95M, and from about 0.70M to about 0.95M. For example, the electrolyte may include a 0.8M solution of tetraethyl ammonium tetrafluoroborate, tetraethylmethyl ammonium tetrafluoroborate and/or spiro-(1,1')-bipyrrolidinium tetrafluoroborate, in acetonitrile.

In some embodiments, a reduced salt concentration in an electrolyte can enable the electrolyte to have a reduced electrolyte concentration non-homogeneity, the electrolyte concentration non-homogeneity being typically created under non-uniform current densities. The electrolyte concentration non-homogeneity may facilitate salt precipitation onto one or more electrode surfaces, for example occluding one or more electroactive sites to negatively impact an energy storage device performance. The electrolyte having a reduced salt concentration may prevent or substantially prevent an electrolyte concentration non-homogeneity when the energy storage is operating at increased voltages, for example under high current charge and discharge cycling. An electrolyte having a reduced salt concentration may enable reduced chemical interaction between the electrolyte and one or more other components of the energy storage device. The reduced chemical interaction may, for example enable a reduced a rate of byproduct generation and therefore provide an improved energy storage device performance.

Figure 5:
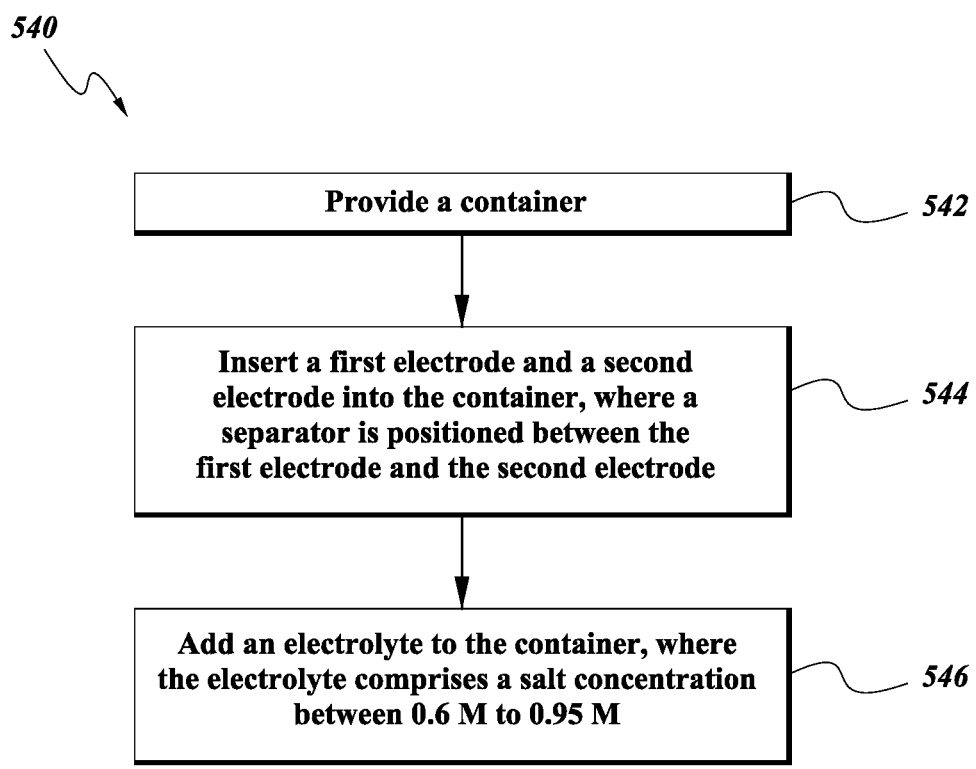
FIG. 5 shows an example of a process for fabricating an energy storage device having a limited molarity electrolyte.

FIG. 5 shows an example of a process 540 for fabricating a final energy storage device product having a limited molarity electrolyte. In block 542, a container can be provided. In block 544, a first electrode and a second electrode can be inserted into the container, where a separator can be positioned between the first electrode and the second electrode. In block 546, an electrolyte can be added to the container, where the electrolyte comprises a salt concentration between 0.6 moles/L (M) to 0.95M. For example, the limited molarity electrolyte can be added to the electrodes and separators of the energy storage device to fully saturate the electrodes and separators without or substantially without providing an excess electrolyte reservoir. In some embodiments, the electrolyte concentration can be about 0.7 M to about 0.95 M, including about 0.8M, or the other ranges described above.

As described herein, an energy storage device with an improved energy density performance can have one or more perforations in one or more of the energy storage device electrodes. In some embodiments, a current collector of the one or more electrodes has the one or more perforations. A perforated current collector may include one or more openings extending through a thickness of the current collector.

In some embodiments, the current collector can have a plurality of perforations extending from a first surface to a second surface of the current collector, for example from a first surface adjacent a first electrode film to a second surface adjacent a second electrode film. In some embodiments, both the current collector and one or more electrode films adjacent the current collector have one or more perforations. One or more perforations in a current collector may or may not correspond to the one or more perforations in an electrode film. For example, one or more perforations of a current collector may be in a location different from that of one or more perforations of an electrode film. In some embodiments, one or more perforations of a current collector can have a shape, dimension, orientation, and/or pattern of distribution different from that of one or more perforations in an electrode film. In some embodiments, one or more perforations in an electrode film may or may not extend through an entire thickness of the electrode film.

Figure 6:
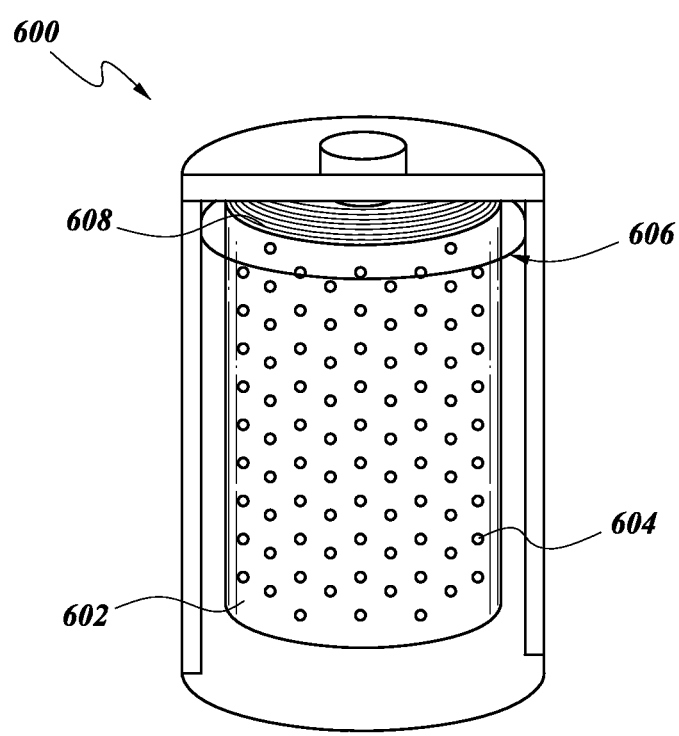
FIG. 6 shows an example of an energy storage device with a jelly-roll that includes a perforated electrode.

FIG. 6 shows an example of an energy storage device 600 with a jelly-roll 608 that includes a perforated electrode 602. Device 600 can be an ultracapacitor, having an increased energy density performance provided at least in part through one or more perforations 604 in electrode 602. A perforated electrode 602 may provide improved access of an energy storage device electrolyte to active material within the electrode 602, facilitating diffusion of the electrolyte within the electrode 602. Improved diffusion of the electrolyte within the electrode 602 may facilitate increased uniformity of electrolyte distribution within the electrode 602. In some embodiments, increased uniformity in the distribution of electrolyte within the electrode 602 can facilitate initial wetting or impregnation of the electrode 602. In some embodiments, improved diffusion of the electrolyte within the electrode 602 may improve device performance (e.g., an energy storage device energy density performance) and/or increase device reliability. For example, improved electrolyte distribution within the electrode 602 may reduce occurrence of localized electrolyte starvation, hot spots and/or salt precipitation (e.g., during a charge-discharge cycle of an energy storage device) within the electrode, energy storage device capacitance fade, and/or any other phenomena resulting from impaired electrolyte access to locations within the electrode which can degrade a device performance.

For example, the energy storage device 600 may include a quantity of a limited molarity electrolyte sufficient to at least saturate one or more separators and electrodes of the energy storage device 600, for example to provide a desired level of separator and/or electrode saturation, without a significant reservoir of electrolyte beyond the quantity of electrolyte needed to saturate the separators and electrodes. For example, the energy storage device 600 may have a zero or near zero over-saturated electrolyte fill level 606, or other quantities of electrolyte, and/or salt concentrations of electrolyte, similar to those described with respect to other embodiments herein.

Figure 7:
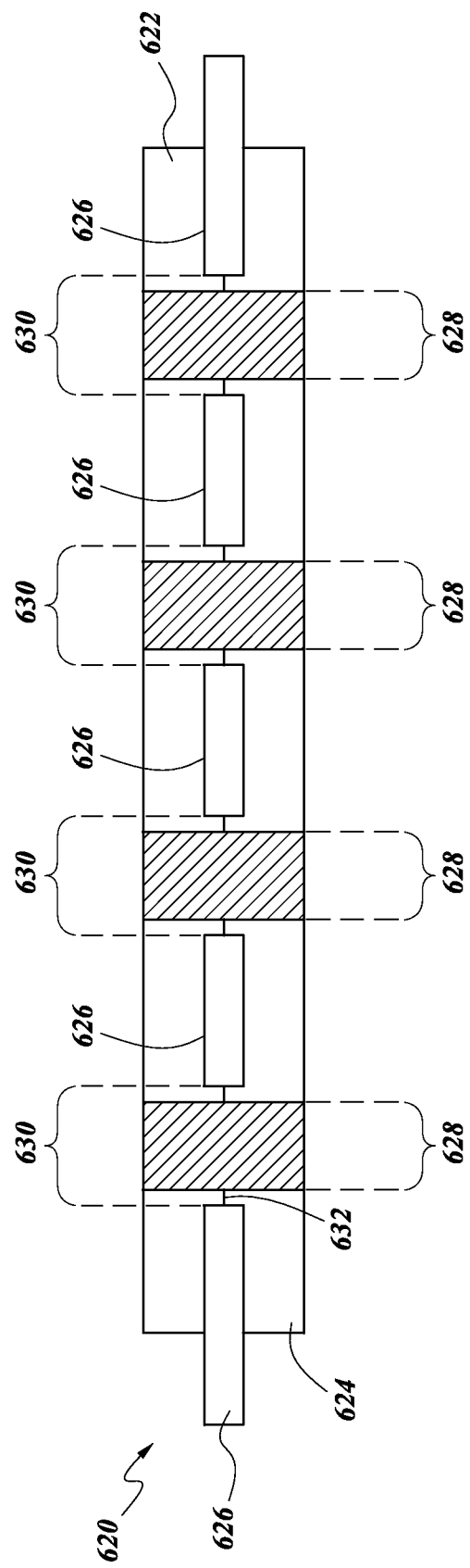
FIG. 7 shows a cross-sectional view of an example perforated electrode having a perforated current collector.

FIG. 7 shows a cross-sectional view of a portion of an example perforated electrode 620. Referring to FIG. 7, the perforated electrode 620 may comprise a first electrode film 622 on a first surface of a current collector 626 and a second electrode film 624 on a second surface of a current collector 626. The electrode 620 may have one or more perforations 628 which correspond to one or more perforations 630 in the current collector 626. The first electrode film 622 and/or the second electrode film 624 can fill some or no part of the one or more perforations 630 of the current collector 626.

In some embodiments, the first electrode film 622 and the second electrode film 624 can be in contact with each other within one or more current collector perforations 630, forming an interface 632 within the one or more current collector perforations 630 such that a configuration of one or more perforations 628 in the electrode films 622, 624 is different from that of one or more perforations 630 in the current collector 626. In the embodiment shown in FIG. 7, the electrode film perforations 628 have a dimension which is smaller than a dimension of the current collector perforations 630. Contact between the first electrode film 622 and the second electrode film 624 can enhance a bonding of the first electrode film 622 and/or the second electrode film 624 to the current collector 626. For example, a coupling between the electrode films through the one or more current collector perforations 630 may enhance attachment of the electrode films to the current collector 626. In some embodiments, the first electrode film 622 and the second electrode film 624 may not be in contact with one another within the one or more current collector perforations 630.

Figure 8:
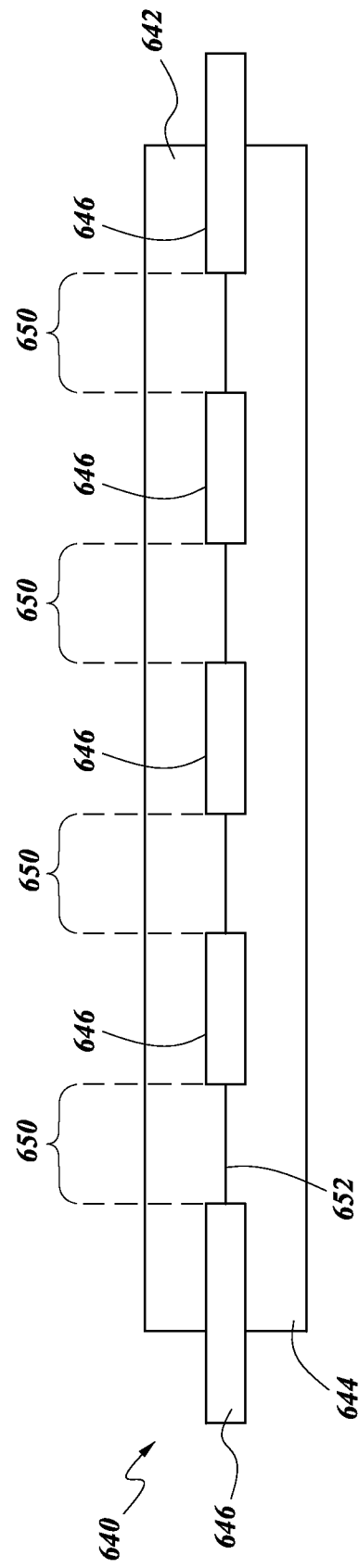
FIG. 8 shows a cross-sectional view of an example electrode having a perforated current collector.

FIG. 8 shows a cross-sectional view of a portion of an example electrode 640 having a first electrode film 642 adjacent a first surface of a perforated current collector 646 and a second electrode film 644 adjacent a second surface of the perforated current collector 646, where the first electrode film 642 and/or the second electrode film 644 can fill or substantially fill one or more of the perforations 650 of the current collector 646. For example, one or more perforations 650 formed in the current collector 646 are not formed in the first electrode film 642 and the second electrode film 644. The first electrode film 642 and/or the second electrode film 644 may fill or substantially fill each of the plurality of perforations 650 in the current collector 646 such that the first electrode film 642 can be in contact with the second electrode film 644 at an interface 652 and the electrode films 642, 644 do not have perforations which correspond to the perforations 650 of the current collector 646.

In some embodiments, the plurality of perforations of a current collector and/or an electrode film can have a configuration optimized to facilitate diffusion of the electrolyte within the electrode. In some embodiments, the plurality of perforations of a current collector and/or an electrode film can have a shape, a dimension (e.g., a length and/or a diameter), an orientation and/or a pattern of distribution optimized for an improved device performance (e.g., an energy density performance). For example, a current collector and/or an electrode film may include a plurality of perforations having a shape, a dimension, an orientation and/or a pattern of distribution configured to improve electrolyte diffusion within the electrode, while providing a desired level of electrical coupling between the electrode and an external circuit and/or a desired level of structural robustness.

In some embodiments, the plurality of perforations in a current collector and/or an electrode film can have a uniform or a substantially uniform shape, dimension and/or orientation. For example, a current collector and/or an electrode film can include a plurality of perforations having a uniform or substantially uniform oval or substantially oval shape, a rectangular or substantially rectangular shape, and/or a circular or substantially circular shape. Other shapes can also be suitable. The perforations may all have the same orientation, for example the perforations in a current collector and/or an electrode film may be aligned with a respective edge of the current collector and/or the electrode film. Perforations along an edge of the current collector and/or electrode film can be at a uniform or substantially uniform distance from the respective edge of the current collector or electrode film. In some embodiments, the plurality of perforations can be evenly distributed across a respective width and/or a respective length of a current collector and/or an electrode film. A plurality of perforations in a current collector and/or an electrode film can be distributed along one or more respective edge portions, diagonal portions, and/or center portions of the current collector and/or the electrode film. Other patterns of perforation distribution may also be suitable.

A current collector may include a plurality of oval perforations uniformly or substantially uniformly distributed across a surface of the current collector. A current collector may include a plurality of rectangular perforations evenly distributed along a length and/or a width of the current collector, including along the entire length and/or width of the current collector. For example, the current collector may have two rows of rectangular perforations across a dimension (e.g., a width and/or a length) of the current collector, the rectangular perforations having the same orientation and size, and being uniformly distributed along the dimension of the current collector. One or more electrode films adjacent a surface of the current collector may or may not include perforations corresponding to the perforations in the current collector.

In some embodiments, a plurality of perforations in a current collector and/or an electrode film can have non uniform shapes, dimensions, orientations, and/or patterns of distribution. For example, a perforation in a current collector can have a shape, dimension, and/or orientation different from that of another perforation in the current collector. A perforation in an electrode film can have a shape, dimension, and/or orientation different from that of another perforation in the electrode film. A shape, dimension, orientation, and/or pattern of distribution of perforations in a current collector may be different from that of perforations in the electrode film. For example, perforations along an edge of a current collector and/or an electrode film may not be uniformly spaced from the respective edge of the current collector and/or electrode film.

In some embodiments, a current collector can have a plurality of perforations where each perforation has a longest dimension within a range of about 100 microns ($\mu$m) to about 300 microns ($\mu$m). For example, a current collector may have a plurality of perforations having a circular or substantially circular shape, each perforation having a diameter within a range of about 100 microns ($\mu$m) to about 300 microns ($\mu$m). In some embodiments, a plurality of perforations of a current collector can have a pattern of distribution such that the current collector has about 50 to about 170 perforations per square inch. For example, a current collector may have a plurality of circular or substantially circular perforations each having a diameter of about 100 microns ($\mu$m) to about 300 microns ($\mu$m), and from about 50 to about 170 perforations per square inch, such that a total cross-sectional area of the perforations can be about 1% to about 3% of a surface area of the current collector. As described herein, one or more electrode films covering a surface of the current collector may or may not include electrode film perforations corresponding to the perforations in the current collector.

In some embodiments, an energy storage device having an improved energy density performance can include a perforated current collector and/or a perforated electrode film, the degree of perforation in the current collector and/or the electrode film being configured to facilitate contact between an energy storage device electrolyte and an active material of the energy storage device electrode. In some embodiments, a perforated current collector and/or a perforated electrode film can be configured to facilitate diffusion of electrolyte within an electrode, while providing a desired level of structural robustness and/or sufficient electrical connectivity between the electrode and an external electrical circuitry. For example, a current collector can include a plurality of perforations having a shape, a dimension, and/or a pattern of distribution across the current collector such that the perforations have a total cross-sectional area of about 1% to about 50% of a surface area of the current collector. In some embodiments, the total cross-sectional area of the perforations can be less than about 10% of the surface area of the current collector. In some embodiments, the total cross-sectional area of the perforations can be about 1% to about 5% of the surface area of the current collector. For example, the total cross-sectional area of the perforations can be about 3% of the surface area of the current collector. One or more electrode films on one or more surfaces of the current collector may or may not include electrode film perforations corresponding to the perforations in the current collector. Other suitable percentages of perforations in a current collector and/or an electrode film may also be suitable to provide an electrode configured to facilitate diffusion of electrolyte, while providing a desired level of structural robustness and/or electrical connectivity between the electrode and an external electrical circuitry. In some embodiments, a current collector can have a total perforation cross-sectional area of about 40%, about 30%, or about 20% of the surface area of the current collector.

The one or more perforations on a current collector and/or an electrode film may be formed through a mechanical means (e.g., through a mechanical puncture process) and/or a non-mechanical means. The one or more perforations in a current collector and/or an electrode film may be formed before and/or after the electrode film is attached (e.g., calendared) to a surface of the current collector. For example, one or more current collector perforations may first be formed in a current collector, and one or more electrode film perforations may be then formed in an electrode film after the electrode film is calendared onto a surface of the current collector. In some embodiments, both perforations in the current collector and the electrode film are formed after the electrode film is calendared onto the current collector.

It will be understood that the embodiments of energy storage devices described herein with respect to limited electrolyte quantity, ranges of electrolyte salt concentrations, and perforated electrodes can be used separately, or in any combination with each other, to provide various levels of improved energy density performance. In one embodiment, an energy storage device having an improved energy density performance can include an electrolyte comprising a solution of acetonitrile and tetraethyl ammonium tetrafluoroborate at a concentration of about 0.8M, and a quantity of electrolyte to sufficiently saturate the electrodes and separators of the energy storage device without a significant electrolyte reservoir beyond that quantity. An energy storage device having an electrolyte with a reduced salt concentration, and a near zero over-saturated electrolyte fill level may facilitate an energy storage device with increased utilization of an electrode active material (e.g., activated carbon), facilitating increased operating voltage and thereby providing increased energy density, while decreasing an amount of available salt for secondary reactions which can generate byproducts to degrade a performance of the energy storage device. In some embodiments, the electrolytic salt can be tetraethyl ammonium tetrafluoroborate. In some embodiments, the electrolytic solvent can be acetonitrile. In some embodiments, the energy storage device comprises an electrolytic salt concentration of about 0.8M. In one embodiment, an energy storage device having an improved energy density performance can include a first electrode with a perforated current collector, an electrolyte comprising a salt concentration of about 0.6 moles/L (M) to about 0.95 M and a quantity of electrolyte to fully saturate the electrode and the separator without a significant quantity of electrolyte reservoir in excess of that quantity. In some embodiments, the energy storage device can include a first electrode having a first perforated current collector, and a second electrode having a second perforated current collector. An electrode may include a first electrode film on a first surface of the current collector and a second electrode film on a second surface of the current collector, the first and the second electrode films may or may not have perforations corresponding to the one or more perforations in the current collector.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. A final energy storage device product, comprising:
a container;
a first electrode;
a second electrode;
a separator between the first electrode and the second electrode, wherein the first electrode, second electrode and separator are within the container; and
an electrolyte within the container, the electrolyte having a total mass between a saturation quantity and 104% of a saturation quantity of electrolyte;
wherein the saturation quantity of electrolyte is the minimum amount of electrolyte in the container that is required to saturate the accessible spaces of the separator, the first electrode and the second electrode.

2. The device product of claim 1, wherein the mass of the electrolyte is less than or equal to 102% of the saturation quantity of electrolyte.

3. The device product of claim 2, wherein the mass of the electrolyte is less than or equal to 101% of the saturation quantity of electrolyte.

4. The device product of claim 1, wherein the energy storage device is sealed.

5. The device product of claim 1, wherein the energy storage device is configured to operate at an operating voltage of 3 Volts (V).

6. The device product of claim 1, wherein the energy storage device comprises a jelly-roll configuration.

7. The device product of claim 1, wherein the electrolyte comprises a salt concentration of 0.75 moles/L (M) to 0.95 M.

8. The device product of claim 1, wherein at least one of the first electrode and the second electrode comprises a plurality of perforations.

9. The device product of claim 1, wherein the electrolyte further comprises:
a salt concentration selected to reduce precipitation of electrolyte salts within the container, wherein the salt concentration is 0.6 moles/L (M) to 0.95M and acetonitrile.

10. The device product of claim 9, wherein the electrolyte comprises a salt concentration of 0.8M.

11. The device product of claim 1, wherein the electrolyte comprises a quaternary ammonium salt.

12. The device product of claim 11, wherein the quaternary ammonium salt comprises a cation selected from the group consisting of spiro-(1,1')-bipyrrolidinium, triethylmethyl ammonium and tetraethyl ammonium.

13. The device product of claim 11, wherein the quaternary ammonium salt comprises tetrafluoroborate.

14. A method of fabricating an energy storage device, comprising:
providing a container;
inserting a first electrode and a second electrode into the container, wherein a separator is positioned between the first electrode and the second electrode; and
adding a final, total mass of electrolyte to the container, wherein the total mass is between a saturation quantity and 104% of a saturation quantity of electrolyte;
wherein the saturation quantity of electrolyte is the minimum amount of electrolyte in the container that is required to saturate the accessible spaces of the separator, the first electrode and the second electrode.

15. The method of claim 14, wherein adding the total mass of the electrolyte comprises adding a mass of electrolyte less than or equal to 102% of the saturation quantity of electrolyte.

16. The method of claim 14, further comprising sealing the energy storage device.

17. The method of claim 14, wherein the energy storage device comprises an ultracapacitor.

18. The method of claim 14, wherein adding the mass of the electrolyte comprises adding an electrolyte having a salt concentration of 0.7 M to 0.95 M, and wherein the salt comprises at least one of tetraethyl ammonium tetrafluoroborate and spiro-(1,1')-bipyrrolidinium tetrafluoroborate.

19. The method of claim 14, wherein adding the total mass of electrolyte comprises adding an additional 3 grams (g) or less of electrolyte in addition to the saturation quantity of electrolyte.

20. The method of claim 14, wherein adding the electrolyte comprises adding an electrolyte having a salt concentration of 0.6M to 0.95M and acetonitrile.

21. The method of claim 20, wherein adding the electrolyte comprises adding an electrolyte having salt concentration of 0.8M.

22. The method of claim 14, wherein adding the electrolyte comprises adding at least one of a spiro-(1,1')-bipyrrolidinium tetrafluoroborate, triethylmethyl ammonium tetrafluoroborate and tetraethyl ammonium tetrafluoroborate.

23. A method of fabricating an energy storage device, comprising:
    providing a container;
    inserting a first electrode and a second electrode into the container, wherein a separator is positioned between the first electrode and the second electrode; and
    adding a final, total mass of electrolyte to the container with an electrolyte injection tool, wherein the total mass corresponds to the saturation quantity of electrolyte combined with an additional mass of electrolyte corresponding to the manufacturing tolerance of the electrolyte injection tool, wherein the saturation quantity of electrolyte is the minimum amount of electrolyte in the container that is required to saturate the accessible spaces of the separator, the first electrode and the second electrode.

* * * * *